United States Patent
Wang

(10) Patent No.: US 9,926,696 B2
(45) Date of Patent: Mar. 27, 2018

(54) DEODORIZING URINAL

(71) Applicant: ARTEPOZA International Trading Co., Ltd., Taichung (TW)

(72) Inventor: Sheng-Cheng Wang, Taichung (TW)

(73) Assignee: ARTEPOZA International Trading Co., Ltd., Taichung (TW)

( * ) Notice: Subject to any disclaimer, the term of this patent is extended or adjusted under 35 U.S.C. 154(b) by 279 days.

(21) Appl. No.: 14/876,079

(22) Filed: Oct. 6, 2015

(65) Prior Publication Data

US 2016/0237671 A1  Aug. 18, 2016

(30) Foreign Application Priority Data

Feb. 13, 2015 (TW) .............................. 104105064 A

(51) Int. Cl.
| | |
|---|---|
| *E03D 13/00* | (2006.01) |
| *E03D 9/00* | (2006.01) |
| *G01K 13/00* | (2006.01) |
| *E03D 9/02* | (2006.01) |

(52) U.S. Cl.
CPC ........... *E03D 13/007* (2013.01); *E03D 9/005* (2013.01); *E03D 13/005* (2013.01); *G01K 13/00* (2013.01); *E03D 2009/024* (2013.01)

(58) Field of Classification Search
USPC .................................................... 4/309, 306
See application file for complete search history.

(56) References Cited

U.S. PATENT DOCUMENTS 4,773,863 A * 9/1988 Douglas, III .......... A47K 17/00
273/349

FOREIGN PATENT DOCUMENTS

| | | | | |
|---|---|---|---|---|
| DE | 102009020155 A1 * | 11/2010 | ............. | E03D 13/00 |
| EP | 0597286 A1 * | 5/1994 | ............. | E03D 13/00 |

OTHER PUBLICATIONS

Translations of DE102009020155 and EP0597286.*
EP Search Report in corresponding EP application No. 15191713.5 dated Jun. 6, 2016 (7 pages).

* cited by examiner

*Primary Examiner* — Lauren Crane
(74) *Attorney, Agent, or Firm* — Trop Pruner & Hu, P.C.

(57) ABSTRACT

A deodorizing urinal includes a urinal body and a deodorizing device. The deodorizing device is connected to the urinal body, and includes a cooling unit, a releasing unit and a processing unit. The cooling unit is configured to generate a unit of low-temperature deodorizer. The releasing unit is configured to receive and store the unit of low-temperature deodorizer from the cooling unit. The processing unit is coupled to the releasing unit and is configured to generate a releasing signal in response to a trigger condition. The processing unit is configured to send the releasing signal to the releasing unit to enable the releasing unit to release the unit of low-temperature deodorizer stored therein into the urinal body.

10 Claims, 3 Drawing Sheets

DEODORIZING URINAL

CROSS-REFERENCE TO RELATED APPLICATION

This application claims priority of Taiwanese Application No. 104105064, filed on Feb. 13, 2015.

FIELD

The disclosure relates to a urinal, and more particularly to a deodorizing urinal.

BACKGROUND

Conventional deodorizing urinals that are configured to deodorize unpleasant odor can be categorized into two types, namely a flushing type and a cooling type. The conventional deodorizing urinal of the flushing type is configured to clean and dilute unpleasant odorous liquid (e.g., urine) by a flush. For example, Chinese Patent Application Publication No. CN102071734A discloses a conventional deodorizing urinal of the flushing type including a detector, and a water pipe having water soluble material stored therein. The water soluble material is mixed with water and released from the water pipe for cleaning a urinal body of the conventional deodorizing urinal when the detector detects a user approaching the conventional deodorizing urinal.

The conventional deodorizing urinal of the cooling type is configured to slow diffusion of the unpleasant odor. Taiwanese Utility Model Patent No. TW M306598 discloses a conventional deodorizing device of the cooling type to be mounted to a conventional urinal. The conventional deodorizing device includes a circulation pipe filled with a coolant, and a condenser connected to the circulation pipe and configured to cool down the coolant. The coolant in the circulation pipe can cool down the conventional urinal to alleviate the diffusion of the unpleasant odor. However, since the condenser needs to frequently operate to cool down the coolant for maintaining the conventional urinal at a relatively low temperature, power consumption of the condenser is relatively high.

SUMMARY

Therefore, an object of the disclosure is to provide a deodorizing urinal of the disclosure that can alleviate at least one of the drawbacks of the prior arts.

According to the disclosure, the deodorizing urinal includes a urinal body and a deodorizing device. The deodorizing device is connected to the urinal body. The deodorizing device includes a cooling unit, a releasing unit and a processing unit. The cooling unit is configured to generate a unit of low-temperature deodorizer. The releasing unit is configured to receive and store the unit of low-temperature deodorizer from the cooling unit. The processing unit is coupled to the releasing unit, and is configured to generate a releasing signal in response to a trigger condition attributed to a user. The processing unit is further configured to send the releasing signal to the releasing unit to enable the releasing unit to release the unit of low-temperature deodorizer stored therein into the urinal body.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
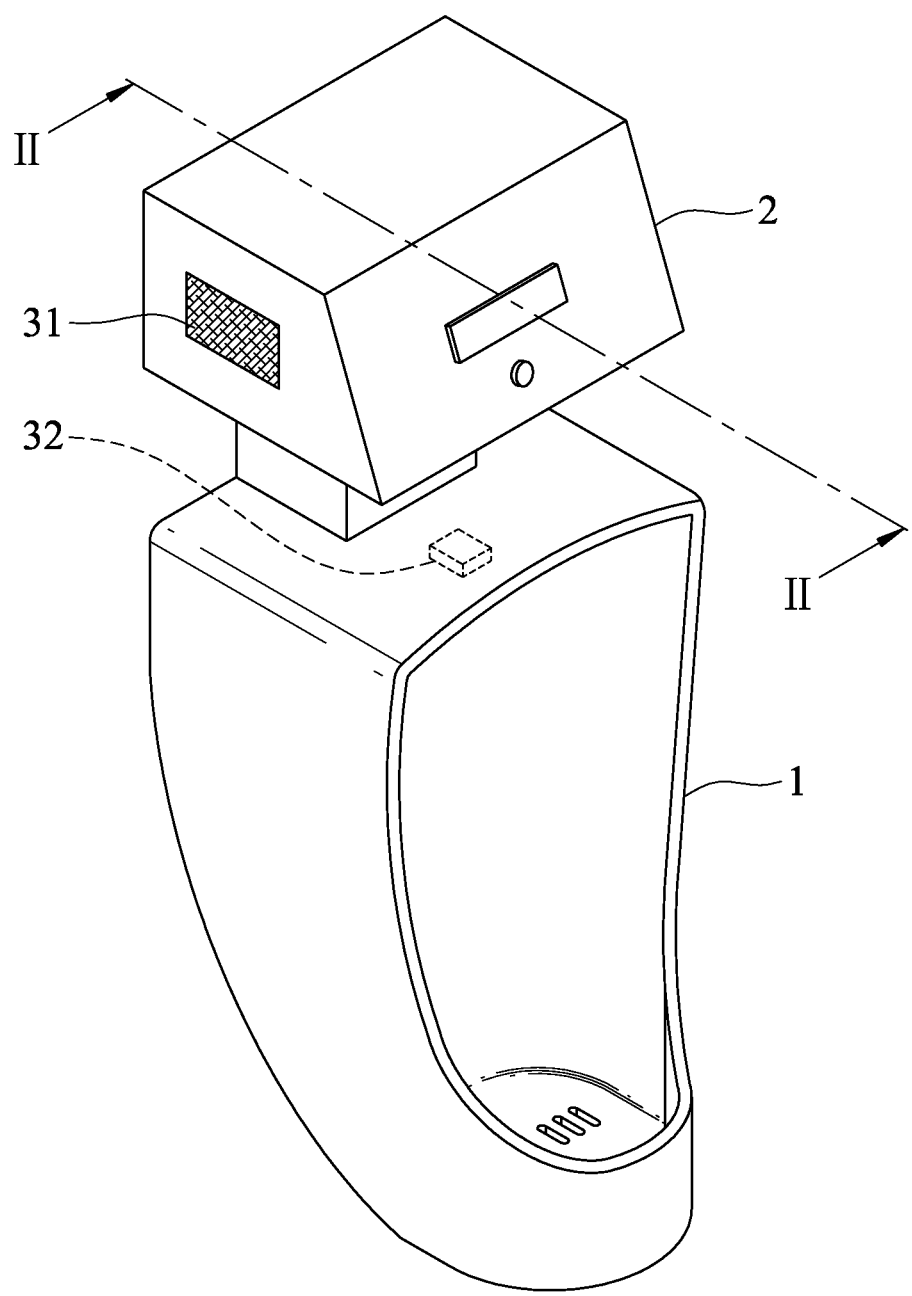
FIG. 1 is a perspective view of an embodiment of a deodorizing urinal according to the disclosure.
Figure 2:
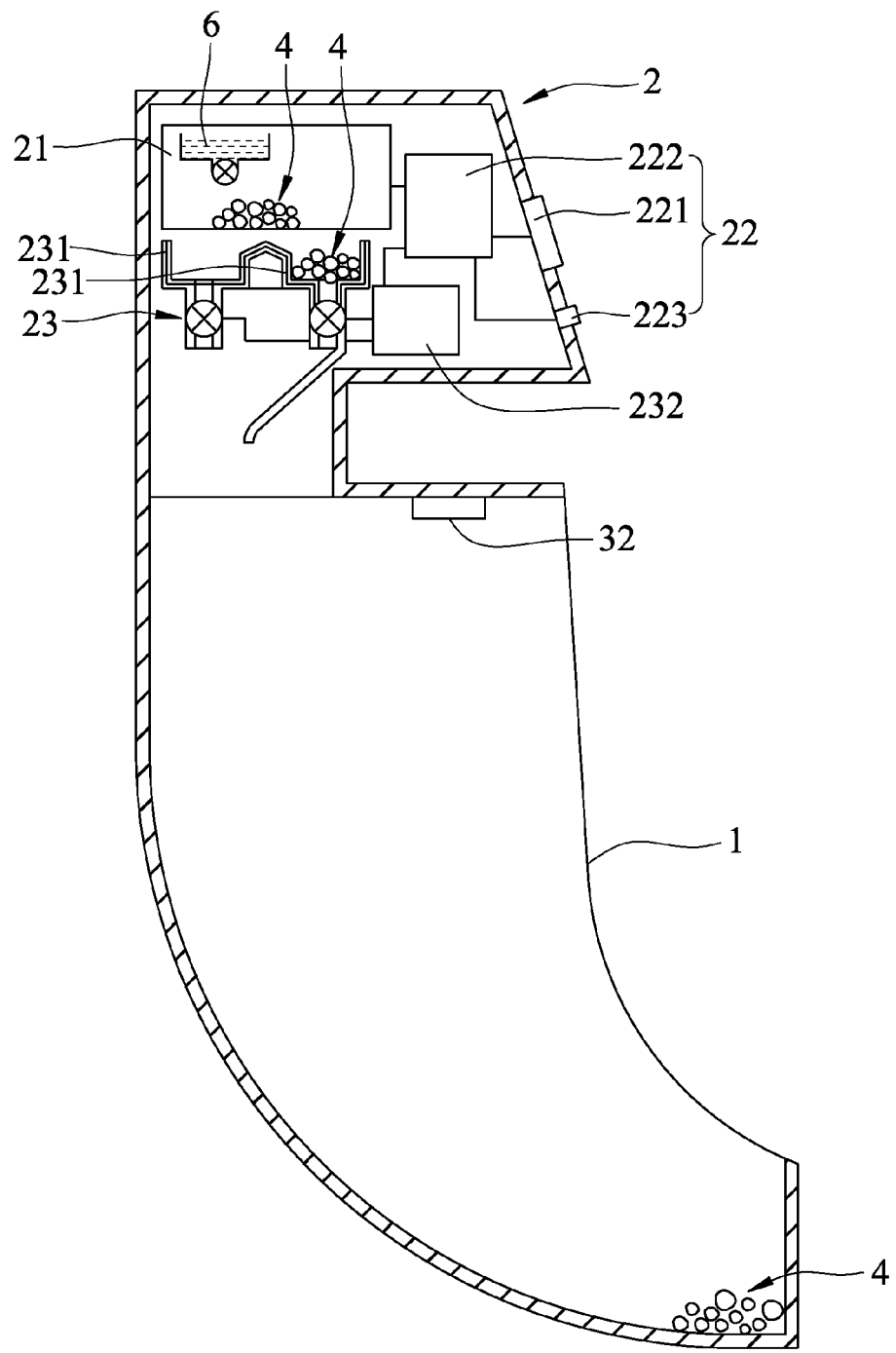
FIG. 2 is an cross-sectional view of the deodorizing urinal taken alone the line II-II in FIG. 1.
Figure 3:
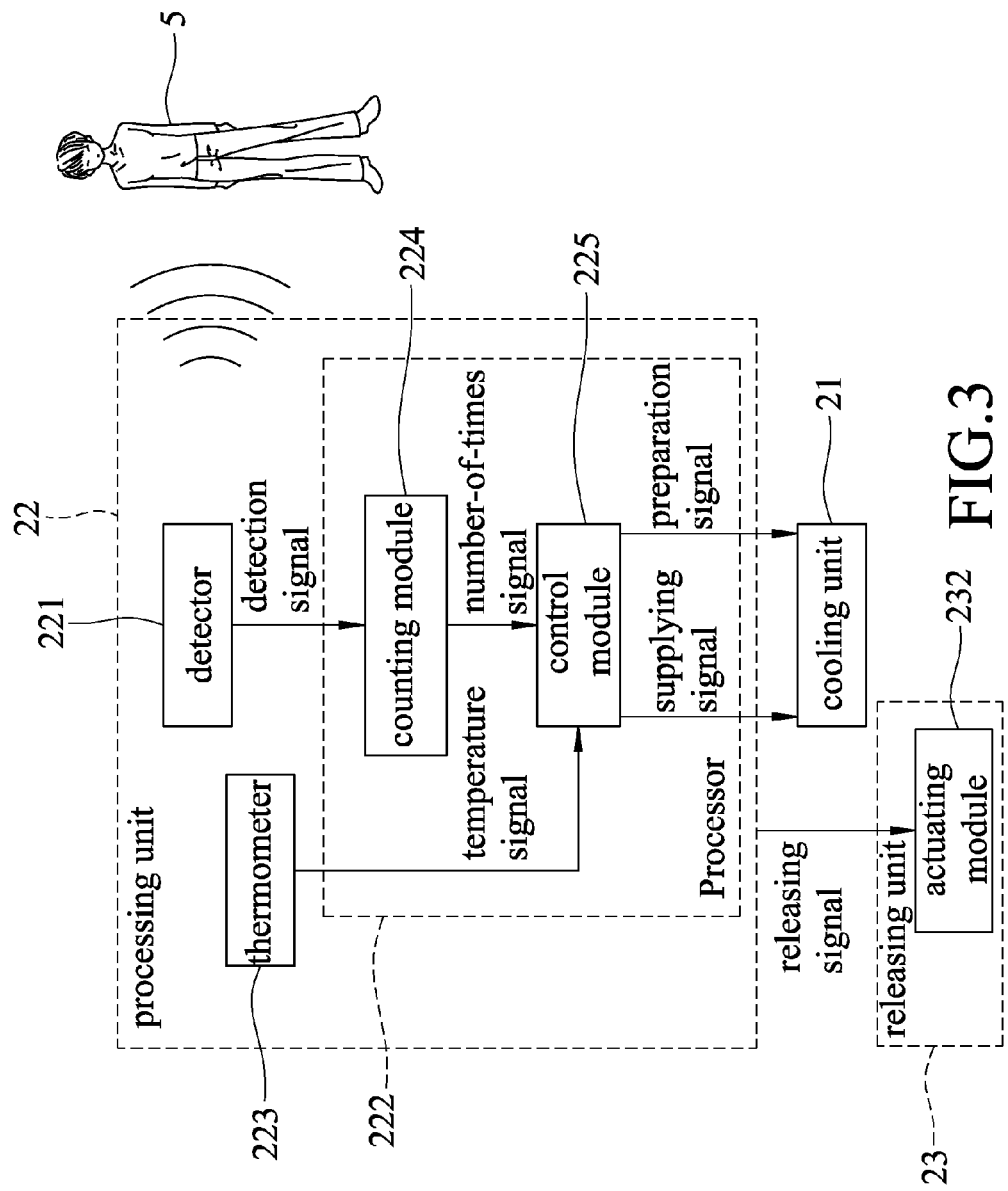
FIG. 3 is a block diagram of the embodiment of the deodorizing urinal.

Referring to FIGS. 1 to 3, the embodiment of the deodorizing urinal according to this disclosure includes a urinal body 1 and a deodorizing device 2. The deodorizing device 2 is connected to the urinal body 1. The deodorizing device 2 includes a cooling unit 21, a processing unit 22 and a releasing unit 23.

The cooling unit 21 is configured to generate a unit of low-temperature deodorizer 4 from a deodorizer cleaning solution 6. In detail, the deodorizer cleaning solution 6 is water, essential oil, cleaner, or the mixture of the above. The cooling unit 21 is configured to cool the deodorizer cleaning solution 6 to generate the unit of low-temperature deodorizer 4 in one of a solid state, a liquid state and a solid-liquid coexistence state.

The processing unit 22 is coupled to the cooling unit 21 and the releasing unit 23, and is configured to generate a releasing signal in response to a trigger condition attributed to a user 5, and to send the releasing signal to the releasing unit 23. The processing unit 22 is further configured to determine a number of times of occurrence of the trigger condition, to generate a preparation signal associated with the number of times of occurrence of the trigger condition, and to send the preparation signal to the cooling unit 21 to enable the cooling unit 21 to adjust cooling power for generating the unit of low-temperature deodorizer 4 according to the preparation signal. Upon receiving the preparation signal, the cooling unit 21 generates the unit of low-temperature deodorizer 4 with the cooling power thus adjusted.

In detail, the processing unit 22 includes a detector 221 and a processor 222. The detector 221 is configured to detect occurrence of the trigger condition. In this embodiment, the detector 221 detects the user 5 approaching the deodorizing urinal by infrared ray as the trigger condition. In other embodiments, the detector 221 may be a trigger button, and the trigger condition is the trigger button being pressed by a user. The detector 221 generates a detection signal when detecting the user 5 approaching the deodorizing urinal. The processor 222 is coupled to the detector 221 for receiving the detection signal therefrom. The processor 222 is configured to generate the preparation signal according to the detection signal, and to send the preparation signal to the cooling unit 21. The cooling unit 21 is enabled by the processor 222 to generate the unit of low-temperature deodorizer 4.

The processor 222 includes a counting module 224 and a control module 225. The counting module 224 is coupled to the detector 221 for receiving the detection signal. The counting module 224 is configured to count a number of times of receipt of the detection signal, i.e., the number of times of occurrence of the trigger condition. Then, the counting module 224 generates a number-of-times signal indicating the number of times of receipt of the detection signal. The control module 225 is coupled to the counting module 224 for receiving the number-of-times signal. The control module 225 is configured to generate the preparation signal according to the number-of-times signal and to send the preparation signal to the cooling unit 21.

The releasing unit 23 is configured to receive and store the unit of low-temperature deodorizer 4 from the cooling unit 21, and to release the unit of low-temperature deodorizer 4 stored therein into the urinal body 1 upon receipt of the releasing signal.

In this embodiment, the cooling unit 21 is configured to generate a plurality of the units of low-temperature deodorizer 4, and the releasing unit 23 is configured to receive and store a plurality of units of low-temperature deodorizer 4. Upon receipt of the releasing signal from the processing unit 22, the releasing unit 23 is enabled to release one of the units of low-temperature deodorizer 4 stored therein into the urinal body 1. The control module 225 is further configured to determine whether the releasing unit 23 still has at least one unit of low-temperature deodorizer 4 stored therein based on the number of times of receipt of the detection signal indicated by the number-of-times signal and a capacity of the releasing unit 23 for storing the units of low-temperature deodorizer 4.

In this embodiment, the releasing unit 23 includes two storage boxes 231 and an actuating module 232. The quantity of the storage boxes 231 may be different according to different requirements in other embodiments. In this embodiment, each of the storage boxes 231 is configured to store one of the units of low-temperature deodorizer 4. One unit of the low-temperature deodorizer 4 generated by the cooling unit 21 is an amount sufficient for filling one of the storage boxes 231. For example, the unit of low-temperature deodorizer 4 in the liquid state or the solid-liquid coexistence state may occupy a predetermined volume. The unit of low-temperature deodorizer 4 in the solid state may have a predetermined number of ice cubes that are shaped, for example, into a crystal shape, a ball shape, or other shapes using an ice tray.

The storage boxes 231 thermally insulate the units of low-temperature deodorizer 4 stored therein. In addition, the cooling unit 21 and a path through which the unit of low-temperature deodorizer 4 is delivered from the cooling unit 21 to the storage boxes 231 are also thermally insulated, for example, by covering an insulation layer (not shown) thereon. Accordingly, the unit of low-temperature deodorizer 4 can be kept at a relatively low temperature, so that the cooling unit 21 does not require frequent operation for cooling the unit of low-temperature deodorizer 4 and power consumption thereof is relatively low. Moreover, the moisture in air will not easily condense on the deodorizing device 2, avoiding occurrence of short circuit in interior circuit of the deodorizing device 2, and will not condense into a water drop dripping down to the urinal body 1 and affecting the appearance of the urinal body 1.

The actuating module 232 is coupled to the processing unit 22 for receiving the releasing signal. The actuating module 232 is configured to make one of the storage boxes 231 release the unit of low-temperature deodorizer 4 into the urinal body 1 in response to receipt of the releasing signal. The temperature of the unit of low-temperature deodorizer 4 is capable of cooling urine in the urinal body 1 to be lower than about 10° C. Under this temperature, diffusion of odor of the urine is significantly slowed down, and the breeding of the bacteria in the urine is restrained. The urinal body 1 is cleaned and deodorized at the same time. According to statistics, an average volume of the urine per urination is about 350 ml, and an average volume of the residual of the urine in a urinal is about 100 ml. The unit of low-temperature deodorizer 4 made of about 30 ml of the deodorizer cleaning solution 6 is sufficient to cool the urine in the urinal body 1 down to about 10° C. by transferring heat therebetween.

The ambient temperature will influence the cooling unit 21 and the unit of low-temperature deodorizer 4. When the ambient temperature increases, cooling efficiency of the cooling unit 21 may decrease, the unit of low-temperature deodorizer 4 may melt and the temperature of the unit of low-temperature deodorizer 4 may increase and may be insufficiently low for cooling the urine in the urinal body 1. Hence, the processing unit 22 further includes a thermometer 223 configured to measure the ambient temperature and to output a temperature signal indicating the ambient temperature to the control module 225. The control module 225 is configured to determine a value of cooling power according to the number-of-times signal and the temperature signal, to generate the preparation signal indicating the value of cooling power, and to send the preparation signal to the cooling unit 21 to enable the cooling unit 21 to adjust the cooling power for generating the unit of low-temperature deodorizer 4 and to generate the plurality of the units of low-temperature deodorizer 4 for filling the storage boxes 231 in response to receipt of the preparation signal. Upon determining that the releasing unit 23 is empty, the control module 225 of the processor 222 generates a supplying signal, and sends the supplying signal to the cooling unit 21 to enable the cooling unit 21 to supply the units of low-temperature deodorizer 4 generated thereby to the releasing unit 23. The counting module 224 of the processor 222 is configured to count the number of times of receipt of the detection signal within a predetermined period beginning from a last time when the processor 222 generates the supplying signal.

The deodorizing urinal further includes an audio output device 31 configured to sound, for example, to play soft music, for comforting user's mood, and a lighting device 32 configured to light up the urinal body 1 and the unit of low-temperature deodorizer 4. The audio output device 31 is set at a case of the deodorizing device 2, and the lighting device 32 is set at the urinal body 1. Besides, the audio output device 31 and the lighting device 32 are also configured to notify that the deodorizing urinal is out of order, for example, to notify that the urinal body 1 is clogged or the cooling unit 21 is out of the deodorizer cleaning solution 6, and to warn against use of the deodorizing urinal.

In sum, the effects of the deodorizing urinal according to this disclosure are described below:

1. For saving energy, the control module 225 is operable to determine the value of the cooling power of the cooling unit 21, and the cooling unit 21 can operate intermittently to provide sufficiently the unit(s) of low-temperature deodorizer 4.

2. The unit of low-temperature deodorizer 4 is capable of efficiently cooling the urine in the urinal body 1 to be lower than about 10° C. by transferring heat with the urine, and the unit of low-temperature deodorizer 4 is made of 30 ml of the deodorizer cleaning solution 6. Accordingly, the usage of the deodorizer cleaning solution 6 is relatively low.

3. The audio output device 31 and the lighting device 32 may improve user experience, and provide notification that the deodorizing urinal is out of order to prevent a user from using the same.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A deodorizing urinal comprising:
   a urinal body; and
   a deodorizing device connected to said urinal body, and including
      a cooling unit configured to generate a unit of low-temperature deodorizer,
      a releasing unit configured to receive and store the unit of low-temperature deodorizer from said cooling unit, and
      a processing unit coupled to said releasing unit and said cooling unit, and configured to generate a releasing signal in response to a trigger condition attributed to a user, to send the releasing signal to said releasing unit to enable said releasing unit to release the unit of low-temperature deodorizer stored therein into said urinal body, to determine a number of times of occurrence of the trigger condition, and to generate a preparation signal associated with the number of times of the occurrence of the trigger condition;
   wherein said processing unit includes
      a detector configured to detect the user approaching said deodorizing urinal, and to generate a detection signal upon detecting the user approaching said deodorizing urinal,
      a processor coupled to said detector for receiving the detection signal therefrom,
      a counting module coupled to said detector for receiving the detection signal, and configured to count a number of times of receipt of the detection signal, and to generate a number-of-times signal indicating the number of times of receipt of the detection signal,
      a thermometer configured to measure an ambient temperature and to output a temperature signal indicating the ambient temperature, and
      a control module coupled to said counting module and said thermometer for receiving the number-of-times signal and the temperature signal, respectively, said control module being configured to determine a value of cooling power according to the number-of-times signal and the temperature signal, to generate the preparation signal according to the number-of-times signal and the detection signal to indicate the value of cooling power, and to send the preparation signal to said cooling unit to enable said cooling unit to adjust cooling power for generating the unit of low-temperature deodorizer according to the preparation signal.

2. The deodorizing urinal as claimed in claim 1, wherein said processor is further configured to determine whether said releasing unit still has the unit of low-temperature deodorizer stored therein, to generate a supplying signal when it is determined that said releasing unit is empty, and to send the supplying signal to said cooling unit to enable said cooling unit to supply the unit of low-temperature deodorizer generated thereby to said releasing unit.

3. The deodorizing urinal as claimed in claim 1, wherein said releasing unit is configured to store a plurality of the units of low-temperature deodorizer, and said control module is further configured to determine whether said releasing unit still has at least one unit of low-temperature deodorizer stored therein based on the number of times of receipt of the detection signal indicated by the number-of-times signal and a capacity of said releasing unit for storing the units of low-temperature deodorizer.

4. The deodorizing urinal as claimed in claim 3, wherein said counting module is configured to count the number of times of receipt of the detection signal within a predetermined period beginning from a last time when said control module generates the supplying signal.

5. The deodorizing urinal as claimed in claim 1, wherein said releasing unit includes:
   at least one storage box configured to store the unit of low-temperature deodorizer and to thermally insulate the unit of low-temperature deodorizer stored therein; and
   an actuating module coupled to said processing unit for receiving the releasing signal, and configured to make said at least one storage box release the unit of low-temperature deodorizer into said urinal body.

6. The deodorizing urinal as claimed in claim 5, wherein said releasing unit includes a plurality of said storage boxes, and said actuating module is configured to make one of said storage boxes release the unit of low-temperature deodorizer stored therein in response to receipt of the releasing signal.

7. The deodorizing urinal as claimed in claim 6,
   wherein said cooling unit is configured to generate, in response to receipt of the preparation signal, a plurality of the units of low-temperature deodorizer for filling said storage boxes.

8. The deodorizing urinal as claimed in claim 1, wherein said cooling unit is configured to cool a deodorizer cleaning solution to generate the unit of low-temperature deodorizer in one of a solid state, a liquid state and a solid-liquid coexistence state.

9. The deodorizing urinal as claimed in claim 1, further comprising an audio output device configured to sound, and a lighting device configured to light up said urinal body.

10. The deodorizing urinal as claimed in claim 1, wherein said cooling unit is configured to generate the unit of low-temperature deodorizer having a temperature capable of cooling urine in said urinal body to be lower than about 10° C.

* * * * *